(12) United States Patent
Amberden (10) Patent No.: US 10,778,746 B1
(45) Date of Patent: Sep. 15, 2020

(54) PUBLISHER SPECIFIED LOAD TIME THRESHOLDS FOR ONLINE CONTENT ITEMS

(71) Applicant: Google LLC, Mountain View, CA (US)

(72) Inventor: Aric Albert Beldon Amberden, Long Beach, CA (US)

(73) Assignee: Google LLC, Mountain View, CA (US)

( * ) Notice: Subject to any disclaimer, the term of this patent is extended or adjusted under 35 U.S.C. 154(b) by 94 days.

(21) Appl. No.: 16/034,656

(22) Filed: Jul. 13, 2018

Related U.S. Application Data

(63) Continuation of application No. 14/524,450, filed on Oct. 27, 2014, now Pat. No. 10,051,029.

(51) Int. Cl.
*G06Q 20/14* (2012.01)
*H04L 29/08* (2006.01)

(52) U.S. Cl.
CPC .............. *H04L 67/02* (2013.01); *G06Q 20/14* (2013.01)

(58) Field of Classification Search
CPC ........................................................ H04L 67/02
USPC ........................................................... 705/40
See application file for complete search history.

(56) References Cited

U.S. PATENT DOCUMENTS

| 6,625,647 | B1 * | 9/2003 | Barrick, Jr. | ......... G06F 11/3419 709/219 |
| 7,962,363 | B2 * | 6/2011 | Patel | ...................... G06Q 30/02 705/14.4 |
| 8,645,362 | B1 * | 2/2014 | Jain | ....................... G06F 16/951 707/723 |
| 9,894,135 | B1 * | 2/2018 | Anderson | ............... H04L 67/02 |
| 2005/0193015 | A1 * | 9/2005 | Logston | .................. G06F 16/44 |
| 2010/0312854 | A1 * | 12/2010 | Hyman | .................. G06Q 30/02 709/217 |
| 2011/0249871 | A1 * | 10/2011 | Zamora Cura | ......... H04L 67/02 382/113 |
| 2012/0066586 | A1 * | 3/2012 | Shemesh | ............. G06F 16/9574 715/235 |
| 2013/0097313 | A1 * | 4/2013 | Zhang | ..................... H04L 67/02 709/224 |
| 2013/0103803 | A1 * | 4/2013 | Parsons | .................. G06Q 10/06 709/218 |
| 2013/0166738 | A1 * | 6/2013 | Ivershen | ................. H04L 43/08 709/224 |
| 2014/0280719 | A1 * | 9/2014 | Cepuran | ................. H04L 67/02 709/217 |
| 2014/0330939 | A1 * | 11/2014 | Kumaran | ............ H04L 43/0882 709/219 |
| 2016/0088059 | A1 * | 3/2016 | Belshe | .................... H04L 29/06 709/247 |
| 2016/0103803 | A1 | 4/2016 | Lann | |

OTHER PUBLICATIONS

Grbovic et al.; 2013 IEEE International Conference on Big Data: Large Scale Ad Latency Analysis; 2013; 6 pages.

* cited by examiner

*Primary Examiner* — Robert R Niquette
(74) *Attorney, Agent, or Firm* — Fish & Richardson P.C.

(57) ABSTRACT

A content management computing device for selecting an online content item for display on a client computing device is provided. Additionally, a method for selecting an online content item for display on a client computing device is provided. In addition, a computer-readable storage device having processor-executable instructions embodied thereon for selecting an online content item for display on a client computing device is provided.

20 Claims, 6 Drawing Sheets

PUBLISHER SPECIFIED LOAD TIME THRESHOLDS FOR ONLINE CONTENT ITEMS

CROSS-REFERENCE TO RELATED APPLICATIONS

This application is a continuation application of, and claims priority to, U.S. patent application Ser. No. 14/524,450, titled "PUBLISHER SPECIFIED LOAD TIME THRESHOLDS FOR ONLINE CONTENT ITEMS," filed on Oct. 27, 2014. The disclosure of the foregoing application is incorporated herein by reference in its entirety for all purposes.

BACKGROUND

This description relates to particular techniques to select a file that includes text, images, video and/or other data for display on a client computing device, and more particularly, to selecting such a file based at least in part on a load time requirement specified by a publisher.

At least some known systems for selecting content items (e.g., a file that includes text, images, video, and/or other data) for display in a publication (e.g., web page) do not factor in the loading time associated with the content items. For example, in at least some known content item selection systems that utilize an auction process, a particular content item may be selected for display because it is relevant to the publication and has a bid (e.g., price that a content provider, such as an advertiser, has agreed to pay for it to be served to a consumer) that is greater than bids associated with other content items under consideration. However, the selected content item may have a loading time that is relatively slow compared to the loading time of the publication. Accordingly, the selected content item may cause the publication as a whole to load slowly on a client computing device. Such a result may be dissatisfactory for publishers who focus on ensuring that their publications load quickly.

BRIEF DESCRIPTION OF DISCLOSURE

In one aspect, a content management computing device is provided. The content management computing device includes one or more processors communicatively coupled to a memory. The content management computing device is communicatively coupled to a publisher computing device, a content provider computing device, and at least one client computing device. The content management computing device is configured to receive a parameter signal from the publisher computing device. The parameter signal includes a price and an associated load time threshold required by a publisher in association with a content slot in a publication served by the publisher computing device. The content management computing device is additionally configured to receive a representation signal from the content provider computing device. The representation signal indicates that a first content item associated with the content provider computing device will load within a first time period. The content management computing device is additionally configured to receive a request signal from the client computing device for content for the content slot in the publication, determine that the first time period is equal to or less than the load time threshold, select the first content item for loading in the content slot, and transmit an instruction signal to the client computing device including an instruction to load the first content item in the content slot in the publication.

In another aspect, a method for selecting an online content item for display on a client computing device is provided. The method is implemented by a content management computing device that includes one or more processors communicatively coupled to a memory. The content management computing device is communicatively coupled to a publisher computing device, a content provider computing device, and the client computing device. The method includes receiving, by the content management computing device, a parameter signal from the publisher computing device. The parameter signal includes a price and an associated load time threshold required by a publisher in association with a content slot in a publication served by the publisher computing device. The method additionally includes receiving, by the content management computing device, a representation signal from the content provider computing device. The representation signal indicates that a first content item associated with the content provider computing device will load within a first time period. Additionally, the method includes receiving, by the content management computing device, a request signal from the client computing device for content for the content slot in the publication. Additionally, the method includes determining, by the content management computing device, that the first time period is equal to or less than the load time threshold, selecting, by the content management computing device, the first content item for loading in the content slot, and transmitting, by the content management computing device, an instruction signal to the client computing device including an instruction to load the first content item in the content slot in the publication.

In another aspect, a computer-readable storage device having processor-executable instructions embodied thereon for selecting an online content item for display on a client computing device is provided. When executed by a content management computing device communicatively coupled to a memory and to the client computing device, the processor-executable instructions cause the content management computing device to receive a parameter signal from the publisher computing device. The parameter signal includes a price and an associated load time threshold required by a publisher in association with a content slot in a publication served by the publisher computing device. The instructions additionally cause the content management computing device to receive a representation signal from the content provider computing device. The representation signal indicates that a first content item associated with the content provider computing device will load within a first time period. Additionally, the instructions cause the content management computing device to receive a request signal from the client computing device for content for the content slot in the publication, determine that the first time period is equal to or less than the load time threshold, select the first content item for loading in the content slot, and transmit an instruction signal to the client computing device including an instruction to load the first content item in the content slot in the publication.

In another aspect, a content management computing device for selecting an online content item for display on a client computing device is provided. The content management computing device is communicatively coupled to a memory, a publisher computing device, a content provider computing device, and at least one client computing device. The content management computing device includes means for receiving a parameter signal from the publisher computing device, the parameter signal including a price and an associated load time threshold required by a publisher in association with a content slot in a publication served by the publisher computing device. Additionally, the content management computing device includes means for receiving a representation signal from the content provider computing device, the representation signal indicating that a first content item associated with the content provider computing device will load within a first time period. Additionally, the content management computing device includes means for receiving a request signal from the client computing device for content for the content slot in the publication. Further, the content management computing device includes means for determining that the first time period is equal to or less than the load time threshold. In addition, the content management computing device includes means for selecting the first content item for loading in the content slot. Additionally, the content management computing device includes means for transmitting an instruction signal to the client computing device including an instruction to load the first content item in the content slot in the publication.

In another aspect, the content management computing device described above is provided, wherein the means for receiving a representation signal further includes means for receiving a representation signal indicating that a content provider associated with the content provider computing device agrees to pay at least the price associated with the load time threshold. In another aspect, the content management computing device described above is provided, wherein the means for transmitting the instruction signal further includes means for transmitting an instruction signal that includes a second instruction to measure an actual time period required to load the first content item and to transmit the actual time period to said content management computing device. In another aspect, the content management computing device described above is provided, further including means for storing, in the memory, the measured time period in association with the first content item. In another aspect, the content management computing device described above is provided, further including means for determining whether the first content item loaded on the client computing device within the load time threshold. In another aspect, the content management computing device described above is provided, further including means for determining an average load time associated with the first content item for each of a plurality of geographic areas.

In another aspect, the content management computing device described above is provided, further including means for transmitting, to the publisher computing device, an average load time for content items transmitted from or to a particular geographic area. In another aspect, the content management computing device described above is provided, further including means for transmitting, to the publisher computing device, an average price associated with the load time threshold. In another aspect, the content management computing device described above is provided, wherein the means for receiving the parameter signal further includes means for receiving a requirement that content to be loaded in the content slot must be hosted on a server computing device that is physically located in a specified geographic area. In another aspect, the content management computing device described above is provided, wherein the means for selecting the first content item further includes means for determining that a second content item is stored in the memory in association with a second time period that is greater than the load time threshold. In another aspect, the content management computing device described above is provided, wherein the means for selecting the first content item further includes means for determining that a second time period associated with a second content item has not been verified. In another aspect, the content management computing device described above is provided, further including means for transmitting a second instruction to the client computing device to not display the first content item if the first content item does not load within the load time threshold.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION OF DISCLOSURE

The following detailed description of implementations refers to the accompanying drawings. The same reference numbers in different drawings may identify the same or similar elements. Also, the following detailed description does not limit the claims.

The systems and methods described herein enable a publisher to specify at least one load time threshold (e.g., an amount of time in which a content item must load for being served) and associated price (e.g., a lowest acceptable bid amount) for content items that will appear on the publisher's web page. Accordingly, a publisher may require a higher price for relatively slower-loading content items to compensate the publisher for displaying content items that cause the publisher's web page to appear to load slowly. Such a system may incentivize content providers (e.g., advertisers) to ensure that their content items load more quickly, for example by placing computing devices that host the content items in geographic areas that are local to client computing devices that will be loading (i.e., receiving and displaying) the content items.

A content management system ("CMS") computing device ("CMS device") described herein is configured to receive a parameter signal from a publisher computing device. The parameter signal includes a price and an associated load time threshold required by a publisher in association with a content slot in a publication served by the publisher computing device. The CMS device additionally receives a representation signal from a content provider computing device. The representation signal indicates that a first content item associated with the content provider computing device will load within a first time period. Additionally, the CMS device receives a request signal from a client computing device for content for the content slot in the publication. The CMS device determines that the first time period is equal to or less than the load time threshold. Further, the CMS device selects the first content item for loading in the content slot and transmits an instruction signal to the client computing device including an instruction to load the first content item in the content slot in the publication.

In some implementations, the representation signal additionally indicates that a content provider associated with the content provider computing device agrees to pay at least the price associated with the load time threshold. In some implementations, the instruction signal includes a second instruction to measure an actual time period required to load the first content item and to transmit the actual time period to the CMS device. In at least some implementations, the CMS device is further configured to store, in a memory, the measured time period in association with the first content item.

Further, in some implementations, the CMS device determines whether the first content item loaded on the client computing device within the load time threshold. In some implementations, the CMS device determines an average load time associated with the first content item for each of a plurality of geographic areas. For example, the content item may be loaded by client computing devices in various geographic areas around the world, each having a different load time, due for example to bandwidth limitations in each geographic area. In some implementations, the CMS device transmits, to the publisher computing device, an average load time for content items transmitted from or to a particular geographic area. In some implementations, the CMS device transmits, to the publisher computing device, an average price associated with the load time threshold. Accordingly, the publisher may specify a price that is in line with what other publishers and content providers have agreed to for similar load time requirements.

In some implementations, the parameter signal includes a requirement that content to be loaded in the content slot must be hosted on a server computing device that is physically located in a specified geographic area (e.g., local caching). Further, in some implementations, in selecting the first content item, the content management server determines that a second content item is stored in a memory in association with a second time period that is greater than the load time threshold. In some implementations, the CMS device is further configured such that selecting the first content item further includes determining that a second time period associated with a second content item has not been verified. For example, while a content provider may state that a particular content item will load within a particular time period, the actual time period required for loading the content item has not been measured and stored in memory. In some implementations, the CMS device is further configured to transmit a second instruction to the client computing device to not display the first content item if the first content item does not load within the load time threshold.

In situations in which the systems discussed herein collect personal information about users, or may make use of personal information, the users may be provided with an opportunity to control whether programs or features collect user information (e.g., information about a user's social network, social actions or activities, profession, interests, preferences, or current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as a city, a ZIP code, or state level), so that a particular location of a user cannot be determined. Thus, the user may have control over how information is collected about the user and used by a content server.

As used herein, an element or step recited in the singular and preceded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effect is achieved by performing at least one of: (a) receiving a parameter signal from a publisher computing device, the parameter signal including a price and an associated load time threshold required by a publisher in association with a content slot in a publication served by the publisher computing device; (b) receiving a representation signal from a content provider computing device, the representation signal indicating that a first content item associated with the content provider computing device will load within a first time period; (c) receiving a request signal from a client computing device for content for the content slot in the publication; (d) determining that the first time period is equal to or less than the load time threshold; (e) selecting the first content item for loading in the content slot; and (f) transmitting an instruction signal to the client computing device including an instruction to load the first content item in the content slot in the publication. The technical effects described herein provide the technical advantage of enabling publishers to specify prices and associated load time thresholds for content items (e.g., files that include text, images, video, and/or other data) to be loaded into portions (e.g., content slots) of one or more publications (e.g., web pages), thereby incentivizing content providers to ensure that their content items load faster than content items associated with other content providers. The resulting technical effect is improved transmission data speed by providing server computing devices that cache data (e.g., content items) in geographic areas that are local to client computing devices that request the data (e.g., content items), improved compression of data (e.g., content files), and/or higher-bandwidth network connections between a server computing device (e.g., content provider computing device) and a client computing device that requests the data (e.g., content items).

Figure 1:
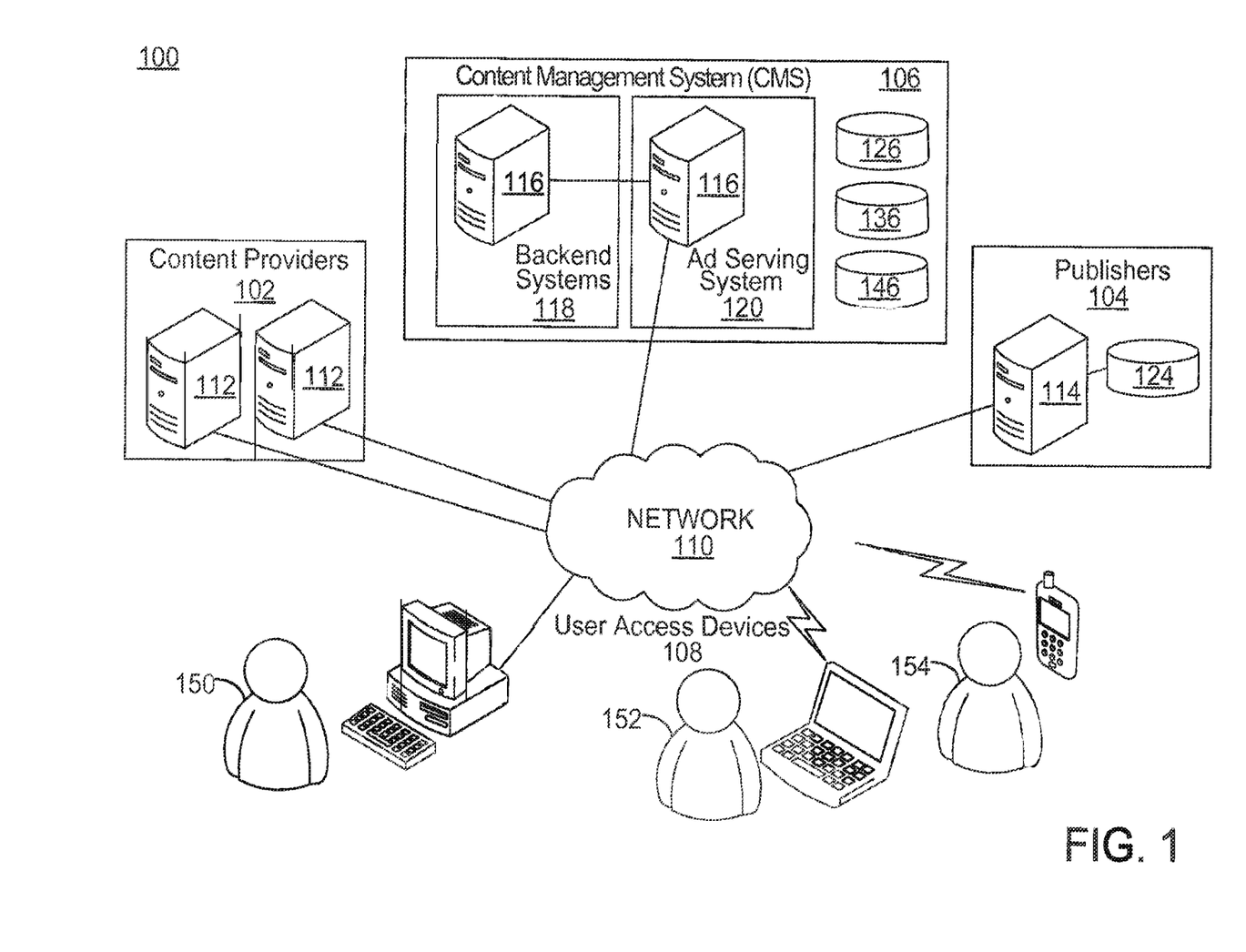
FIG. 1 is a diagram depicting an example networked environment.

FIG. 1 is a diagram depicting an example networked environment. With reference to FIG. 1, an example networked environment 100 may include one or more content providers 102, one or more publishers 104, a content management system (CMS) 106, and one or more user access devices 108 ("client computing devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network. In the example embodiment, content providers 102 include advertisers, and CMS 106 is an advertising management system.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, merchants, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154.

As noted above, one or more of the publishers 104 may represent a publication network. In such an implementation, the content providers 102 may be able to present content to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information. A publisher 104 may also be a content provider 102.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The CMS 106 may include one or more interface or front-end modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-throughs for content as well as the ratio of click-throughs to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. The CMS 106 may store such information in a general database 146. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
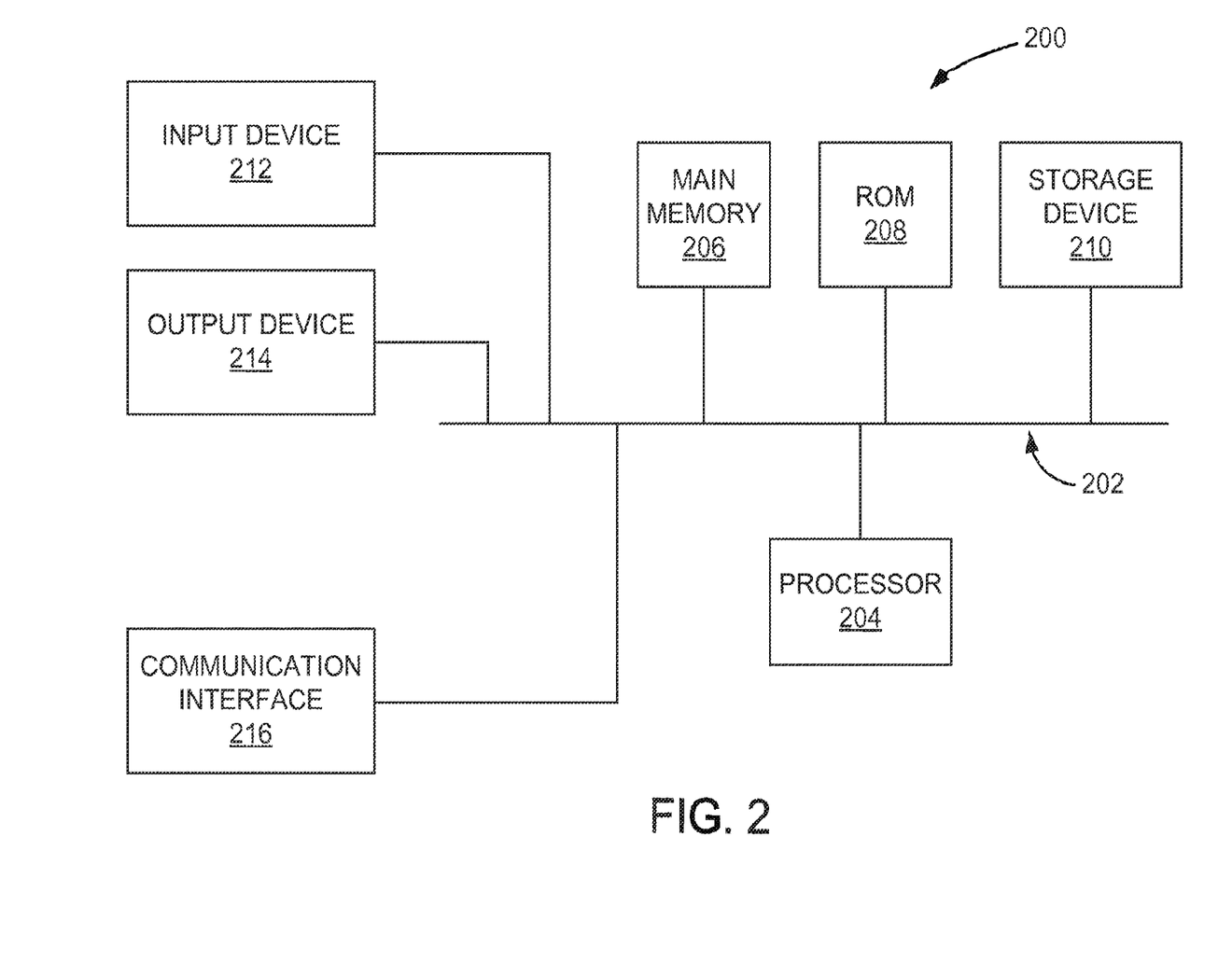
FIG. 2 is a diagram of an example computing device that is used in the environment of FIG. 1.

FIG. 2 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 3:
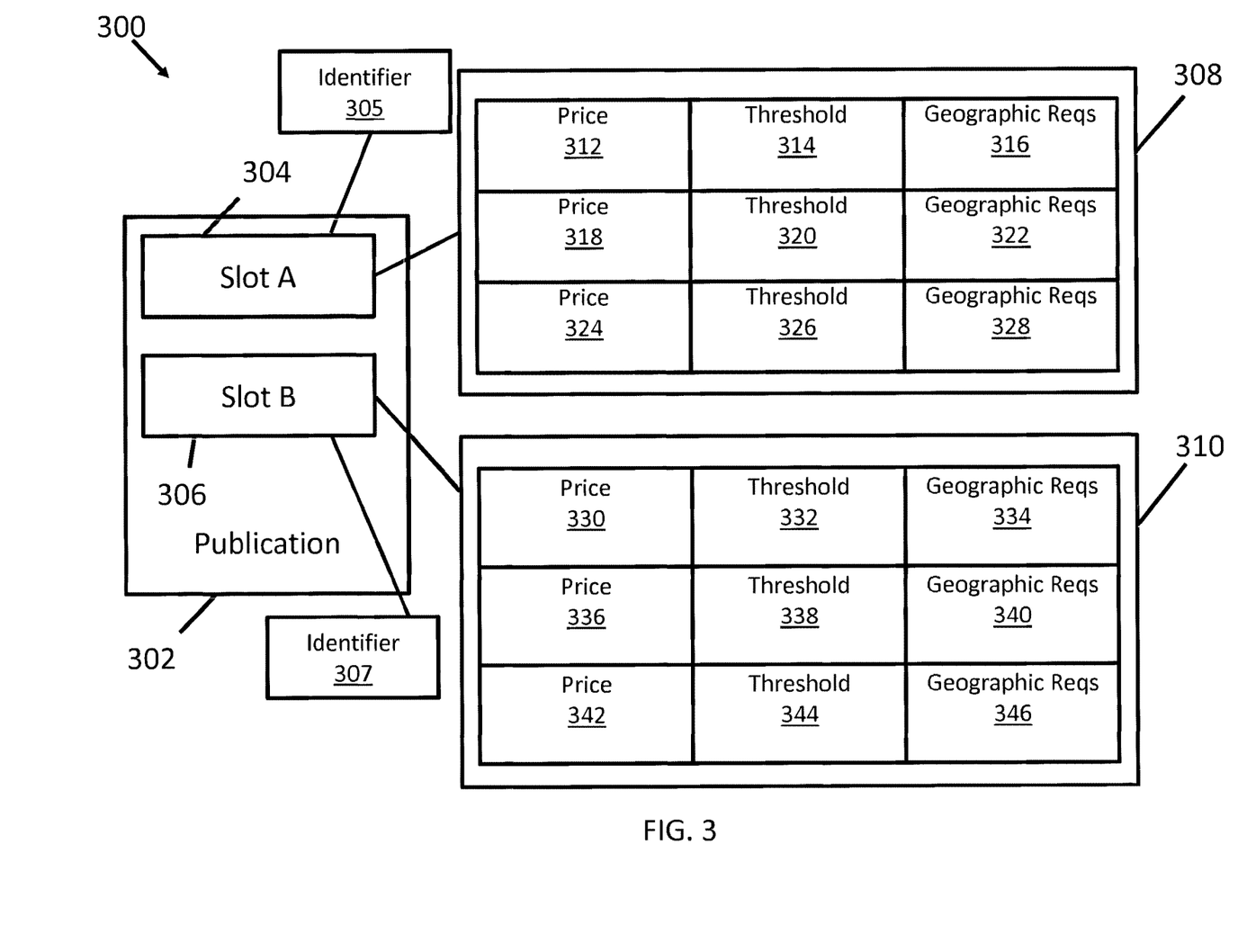
FIG. 3 is a block diagram of an example publication served by a publisher computing device and parameters that a publisher specifies in association with content slots of the publication.

FIG. 3 is a block diagram 300 of an example publication 302 served by a publisher computing device 114 and parameters 308 and 310 that a publisher 104 associated with publisher computing device 114 specifies in association with a first content slot 304 and a second content slot 306 of the publication 302. First content slot 304 is associated with a first identifier 305. Likewise, second content slot 306 is associated with a second identifier 307. First identifier 305 and second identifier 307 are stored by publisher computing device 114 and CMS 106 to identify each of first content slot 304 and second content slot 306. In order to control how quickly content items 408 (shown in FIG. 4) are loaded in each of first content slot 304 and second content slot 306, publisher 104 specifies a price (e.g., first price 312) and a load time threshold (e.g., first load time threshold 314) associated with the price (e.g., first price 312).

More specifically, publisher 104 indicates that, in order for publisher 104 to be willing to allow a content item 408 to load into first content slot 304 by first load time threshold 314 (e.g., 100 milliseconds), a content provider (e.g., content provider 102) must bid at least the first price 312. Publisher 104 also indicates that, in order for publisher 104 to be willing to allow a content item 408 to load into first content slot 304 by a second load time threshold 320 that is greater than the first load time threshold 314 (e.g., 200 milliseconds), a content provider (e.g., content provider 102) must bid at least a second price 318, which is greater than the first price 312. Accordingly, parameters 108 indicate that publisher 104 will be compensated more for content items 408 that load slower than other content items 408. In some implementations, publisher 104 specifies a third price 324 that is greater than first price 312 and second price 318, as well as an associated third load time threshold 326 that is greater than first load time threshold 314 and second load time threshold 320. In at least some implementations, publisher specifies first geographic requirements 316, second geographic requirements 322, and third geographic requirements 328 associated with each of first price 312, second price 318, and third price 324 respectively. Geographic requirements 316, 322, and 318 include geographic distances and/or geographic regions associated with load times of content items 408. For example, in some implementations, geographic requirements 316, 322, and/or 318 indicate whether publisher 104 requires local caching (i.e., local to client computing devices 108) of content items 408 for the specified price 312, 318, and 324. Similarly, second parameters 310 specify a first price 330, a first load time threshold 332, and first geographic requirements 334, a second price 336, a second load time threshold 338, second geographic requirements 340, a third price 342, a third load time threshold 344, and third geographic requirements 346 in association with second content slot 306. In some implementations, second parameters 310 are different than first parameters 308. In some implementations, publisher 104 specifies more than three prices in each set of parameters 308 and 310.

Figure 4:
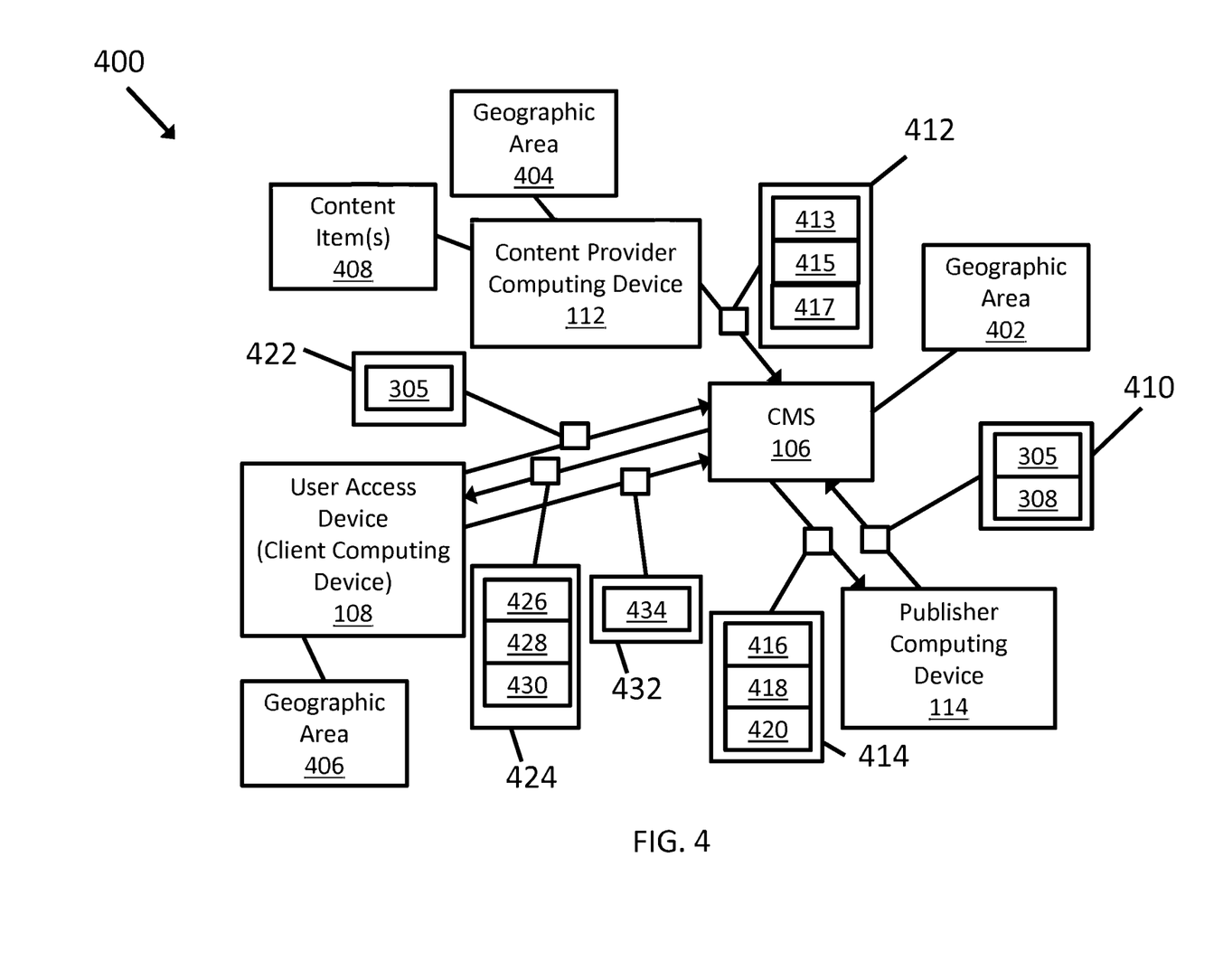
FIG. 4 is a block diagram of example communications among a client computing device, a content management system, a publisher computing device, and a content provider computing device of the environment of FIG. 1.

FIG. 4 is a block diagram 400 of example communications among a client computing device 108, CMS 106, publisher computing device 114, and content provider computing device 112. CMS 106 is associated with (i.e., at least partially located in) a first geographic area 402. Content provider computing device 112 is associated with (i.e., at least partially located in) a second geographic area 404. Client computing device 108 is associated with (i.e., located in) a third geographic area 406. In some implementations, one or more of first geographic area 402, second geographic area 404, and third geographic area 406 are the same. A geographic area is, for example, a city, state, or country. Content provider computing device 112 is also associated with one or more content items 408. For example, in some implementations, content provider computing device 112 serves one or more content items 408. In other implementations, CMS 106 serves one or more content items 408 on behalf of content provider computing device 112.

Publisher computing device 114 transmits a parameter signal 410 to CMS 106. Parameter signal 410 includes first identifier 305 corresponding to first content slot 304 described with reference to FIG. 3. Parameter signal 410 additionally includes parameters 308. As described above, parameters 308 include prices that content providers must bid in order to have their advertisements loaded and displayed in first content slot 304, load time thresholds associated with each price, and, at least in some implementations, geographic requirements pertaining to the geographic areas where the content item is served from and where the client computing device is located. For example, the geographic requirements (e.g., geographic requirements 316) may indicate that local caching is required, in which case publisher 104 requires that the computing device (e.g., content provider computing device 112 or CMS 106) that serves the content item 408 for display in first content slot 304 be located near (e.g., in the same geographic area as) client computing device 108. In some implementations, parameter signal 410 additionally or alternatively includes second identifier 307 and parameters 310.

Content provider computing device 112 transmits a representation signal 412 to CMS 106. Representation signal 412 includes a content item identifier 413, which is, for example, a code that is uniquely associated with one of content items 408. Additionally, representation signal 412 includes at least one time period 415, representing an amount of time that the content item 408 associated with content item identifier 413 will load within, when requested by a client computing device (e.g., client computing device 108). In some implementations, the at least one time period 415 is a plurality of time periods, each associated with different geographic areas 406 of client computing devices 108. For example, for client computing devices 108 in India, representation signal 412 may specify a time period 415 of 300 milliseconds and for client computing devices in the United States, representations signal 412 may specify a time period of 100 milliseconds. Such differences in the time periods 415 may be due to the proximity of content provider computing device 112 to each geographic area 406 and/or network speeds in each geographic area 406. In at least some implementations, representation signal 412 includes a bid amount 417 that content provider 102 is willing to pay to have content item 408 display in a content slot (e.g., first content slot 304).

In some implementations, CMS 106 transmits an information signal 414 to publisher computing device 114 that includes average load times 416, average prices 418 paid by content providers for each load time 416, and geographic areas 420 associated with each load time 416. Upon receiving information signal 414, publisher computing device 114 displays average load times 416, average prices 418 paid by content providers for each load time 416, and geographic areas 420 for use by publisher 104 in specifying parameters 308 and/or 310. It should be understood that, in at least some implementations, parameter signal 410, representation signal 412, and information signal 414 are not transmitted in the order in which they are described herein.

Subsequently, client computing device 108, which has begun loading publication 302 from publisher computing device 114, transmits a request signal 422 to CMS 106 for content (i.e., a content item 408) for at least first content slot 304 in publication 302. More specifically, content slot 304 includes code that instructs client computing device 108 to transmit request signal 422 to CMS 106. Request signal 422 includes first identifier 305. Upon receiving request signal 422, CMS 106 performs an auction process to select a content item (e.g., content item 408) for display in first content slot 304. More specifically, CMS 106 selects one content item (e.g., content item 408) from a plurality of content items for which a content provider (e.g., content provider 102 associated with content provider computing device 112) has represented (e.g., through representation signal 412) that the content item will load within a time period (e.g., time period 415) that is within a load time threshold (e.g., first load time threshold 314) and has a bid amount (e.g., bid amount 417) that is at least equal to a corresponding specified price (e.g., first price 312) in parameters 308.

CMS 106 transmits an instruction signal 424 to client computing device 108 that includes a first instruction 426 to retrieve the selected content item (e.g., content item 408) from the computing device that serves the content item (e.g., content provider computing device 112). In some implementations, instruction signal 424 additionally includes a second instruction 428 to measure an amount of time (e.g., a measured time period 434) required for the selected content item 408 to be loaded by client computing device 108. In some implementations, instruction signal 424 additionally includes a third instruction 430 to timeout after the corresponding load time threshold (e.g., first load time threshold 314) has elapsed. More specifically, for example, third instruction 430 is an instruction to not display anything, or to display an error message, in first content slot 304 if content item 408 is not completely loaded when the corresponding load time threshold (e.g., first load time threshold 314) has elapsed. In some implementations, for example where instruction signal 424 includes second instruction 428, client computing device 108 transmits a report signal 432 to CMS 106 that includes the measured time period 434. In at least some implementations, CMS 106 replaces a represented time period (e.g., time period 415) associated with content item 408 with measured time period 434 in memory (e.g., general database 146).

In some implementations, CMS 106 averages multiple measured time periods 434 and stores an average measured time period associated with each of a plurality of content items (e.g., content item 408). In at least some implementations, CMS 106 compares the represented time period (e.g., time period 415) to a measured time period 434 and verifies that measured time period 434 is less than or equal to the represented time period (e.g., time period 415). In some implementations, if the measured time period 434 is greater than the represented time period (e.g., time period 415), CMS 106 reduces a priority of content item 408 and/or all content items associated with content provider computing device 112 in future auctions.

Figure 5:
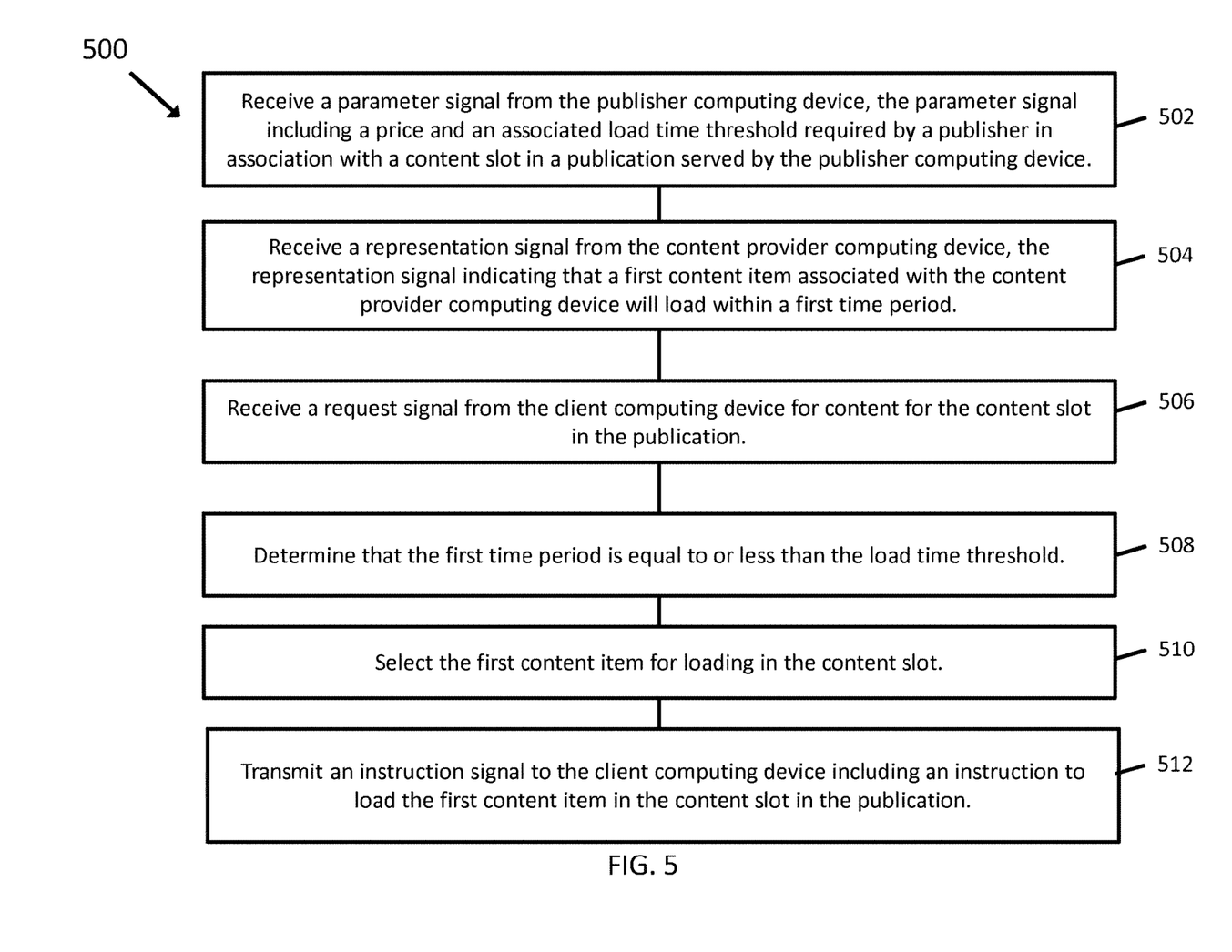
FIG. 5 is a flowchart of an example process for selecting an online content item for display on a client computing device, based in part on publisher specified load time thresholds.

FIG. 5 is a flowchart of an example process 500 for selecting an online content item 408 for display on a client computing device 108, based in part on publisher specified load time thresholds (e.g., first load time threshold 314). Process 500 is carried out by a content management computing device (e.g., CMS 106). Initially, CMS 106 receives 502 a parameter signal (e.g., parameter signal 410) from the publisher computing device (e.g., publisher computing device 114). The parameter signal (e.g., parameter signal 410) includes a price (e.g., first price 312) and an associated load time threshold (e.g., first load time threshold 314) required by a publisher (e.g., publisher 104) in association with a content slot (e.g., first content slot 304) in a publication (e.g., publication 302) served by the publisher computing device (e.g., publisher computing device 114). Additionally, CMS 106 receives 504 a representation signal (e.g., representation signal 412) from the content provider computing device (e.g., content provider computing device 112). The representation signal (e.g., representation signal 412) indicates that a first content item (e.g., content item 408) associated with the content provider computing device (e.g., content provider computing device 112) will load within a first time period (e.g., time period 415). Additionally, CMS 106 receives 506 a request signal (e.g., request signal 422) from the client computing device (e.g., client computing device 108) for content (e.g., content item 408) for the content slot (e.g., first content slot 304) in the publication (e.g., publication 302). Next, CMS 106 determines 508 that the first time period (e.g., first time period 415) is equal to or less than the load time threshold (e.g., first load time threshold 314). Additionally, CMS 106 selects 510 the first content item (e.g., content item 408) for loading in the content slot (e.g., first content slot 304). Further, CMS 106 transmits 512 an instruction signal (e.g., instruction signal 424) to the client computing device (e.g., client computing device 108) including an instruction (e.g., first instruction 426) to load the first content item (e.g., content item 408) in the content slot (e.g., first content slot 304) in the publication (e.g., publication 302).

In some implementations, CMS 106 receives a representation signal (e.g., representation signal 412) indicating that a content provider (e.g., content provider 102) associated with the content provider computing device (e.g., content provider computing device 112) agrees to pay (e.g., bid amount 417) at least the price (e.g., first price 312) associated with the load time threshold (e.g., first load time threshold 314). In some implementations, CMS 106 transmits an instruction signal (e.g., instruction signal 424) that includes a second instruction (e.g., second instruction 428) to measure an actual time period (e.g., measured time period 434) required to load the first content item (e.g., content item 408) and to transmit the actual time period (e.g., measured time period 434) to CMS 106. In some implementations, CMS 106 stores in the memory (e.g., general database 146), the measured time period (e.g., measured time period 434) in association with the first content item (e.g., content item 408). In some implementations, CMS 106 determines whether the first content item (e.g., content item 408) loaded on the client computing device (e.g., client computing device 108) within the load time threshold (e.g., first load time threshold 314). In some implementations, CMS 106 determines an average load time (e.g., average load times 626) associated with the first content item (e.g., content item 408) for each of a plurality of geographic areas (e.g., geographic areas 420). In some implementations, CMS 106 transmits, to the publisher computing device (e.g., publisher computing device 114), an average load time (e.g., average load time 416) for content items (e.g., content items 408) transmitted from or to a particular geographic area (e.g., geographic area 402).

In some implementations, CMS 106 transmits to the publisher computing device (e.g., publisher computing device 114) an average price (e.g., average price 418) associated with the load time threshold (e.g., first load time threshold 314). In some implementations, CMS 106 receives a parameter signal (e.g., parameter signal 410) that includes a requirement (e.g., geographic requirements 316) that content (e.g., content item 408) to be loaded in the content slot (e.g., first content slot 304) must be hosted on a server computing device (e.g., CMS 106 and/or content provider computing device 112) that is physically located in a specified geographic area (e.g., geographic area 404).

In some implementations, in selecting the first content item (e.g., one of content items 408), CMS 106 determines that a second content item (e.g., a second one of content items 408) is stored in the memory (e.g., one of databases 126, 136, and 146) in association with a second time period (e.g., in a represented time periods section 616) that is greater than the load time threshold (e.g., first load time threshold 314). In some implementations, in selecting the first content item (e.g., one of content items 408) CMS 106 determines that a second time period (e.g., in a represented time periods section 616) associated with a second content item (e.g., a second one of content items 408) has not been verified. In other words, CMS 106 has not yet received a measured time period (e.g., measured time period 434) for the second content item and excludes the second content item from consideration. In some implementations, CMS 106 transmits a second instruction (e.g., instruction 430) to the client computing device (e.g., client computing device 108) to not display the first content item (e.g., content item 408) if the first content item (e.g., content item 408) does not load within the load time threshold (e.g., first load time threshold 314).

Figure 6:
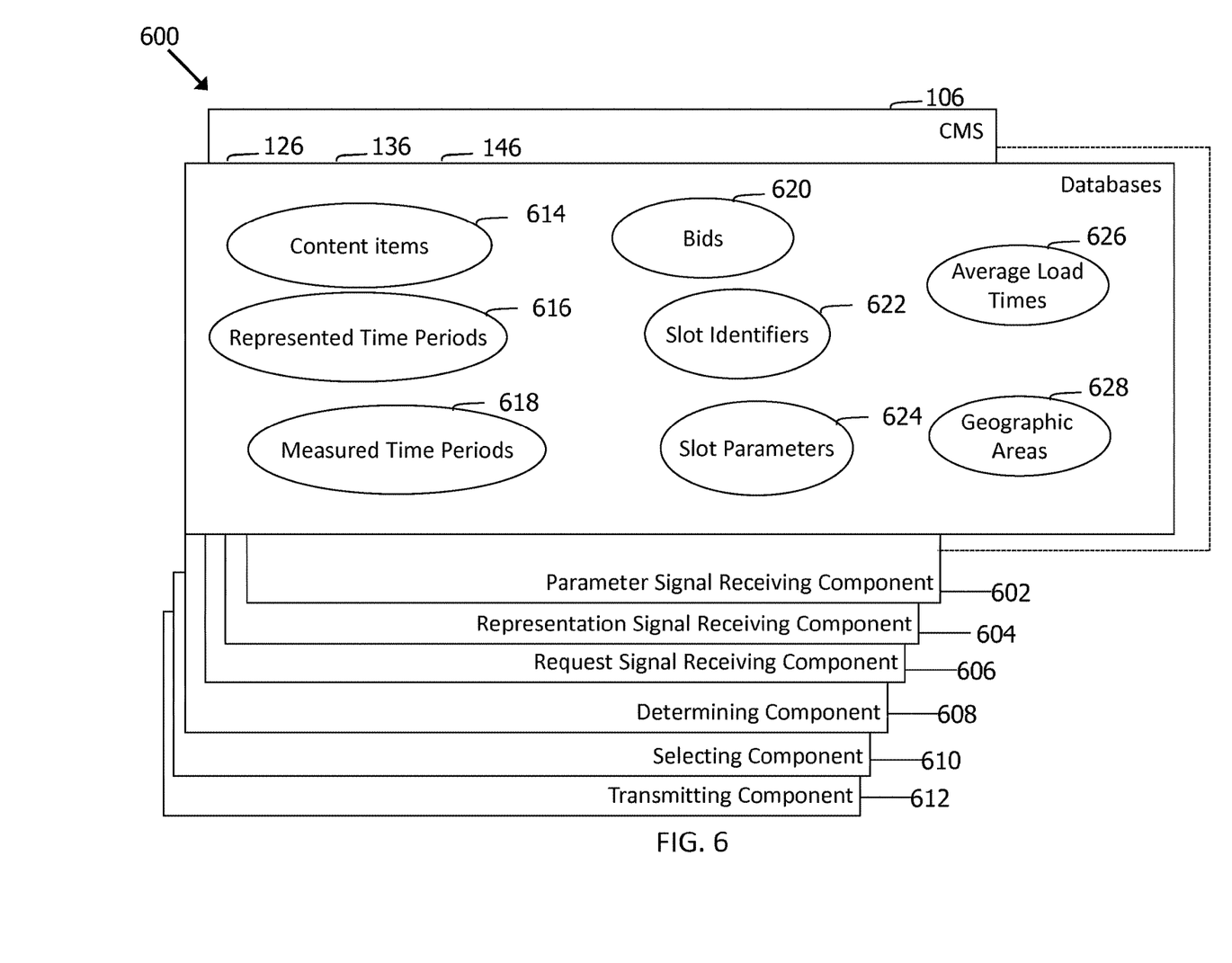
FIG. 6 is a diagram of components of one or more example computing devices that may be used in the environment shown in FIG. 1.

FIG. 6 is a diagram 600 of components of one or more example computing devices 200, that may be used in the environment shown in FIG. 1. For example, one or more of computing devices 200 may form content management system (CMS) 106. FIG. 6 further shows a configuration of databases 126, 136, and 146 (FIG. 1). Databases 126, 136, and 146 are coupled to several separate components within CMS 106, which perform specific tasks.

CMS 106 includes a parameter signal receiving component 602 for receiving a parameter signal (e.g., parameter signal 410) from the publisher computing device (e.g., publisher computing device 114). The parameter signal (e.g., parameter signal 410) includes a price (e.g., first price 312) and an associated load time threshold (e.g., first load time threshold 314) required by a publisher (e.g., publisher 104) in association with a content slot (e.g., first content slot 304) in a publication (e.g., publication 302) served by the publisher computing device (e.g., publisher computing device 114). CMS 106 additionally includes a representation signal receiving component 604 for receiving a representation signal (e.g., representation signal 412) from the content provider computing device (e.g., content provider computing device 112). The representation signal (e.g., representation signal 412) indicates that a first content item (e.g., content item 408) associated with the content provider computing device (e.g., content provider computing device 112) will load within a first time period (e.g., time period 415).

Additionally, CMS 106 includes a request signal receiving component 606 for receiving a request signal (e.g., request signal 422) from the client computing device (e.g., client computing device 108) for content (e.g., content item 408) for the content slot (e.g., first content slot 304) in the publication (e.g., publication 302). CMS 106 additionally includes a determining component 608 for determining that the first time period (e.g., first time period 415) is equal to or less than the load time threshold (e.g., first load time threshold 314). Additionally, CMS 106 includes a selecting component 610 that selects 510 the first content item (e.g., content item 408) for loading in the content slot (e.g., first content slot 304). Further, CMS 106 includes a transmitting component 612 for transmitting an instruction signal (e.g., instruction signal 424) to the client computing device (e.g., client computing device 108) including an instruction (e.g., first instruction 426) to load the first content item (e.g., content item 408) in the content slot (e.g., first content slot 304) in the publication (e.g., publication 302).

In an exemplary embodiment, databases 126, 136, and 146 are divided into a plurality of sections, including but not limited to, a content items section 614, a represented time periods section 616, a measured time periods section 618, a bids section 620, a slot identifiers section 622, a slot parameters section 624, an average load times section 626, and a geographic areas section 628. These sections within databases 126, 136, and 146 are interconnected for use in performing the operations described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or variations that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of the above description may present features in terms of algorithms and symbolic representations of operations on information. Such algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method, comprising:
identifying, for first content provided by a first content provider, a load time period indicating how much time it will take for the first content to load at a client computing device;
determining that the load time period satisfies a load time criterion of a publisher;
determining that second content of a second content provider different from the first content provider will load on the client computing device in a second time period greater than the load time period; and
in response to determining (i) that the first load time period satisfies the load time criterion and (ii) that the second content of the second content provider will load on the client computing device in a second time period greater than the load time period:
selecting, from a set of content that includes at least the first content and the second content, the first content for presentation with the publication of the publisher instead of the second content of the second content provider; and
transmitting, to the client computing device, an instruction to present the selected content with the publication at the client computing device.

2. The method of claim 1, wherein the load time criterion specifies a load time threshold in which content of each content provider must load at the client computing device.

3. The method of claim 1, wherein determining that the load time period satisfies load time criterion of the publisher comprises determining that the load time period is shorter than a second load time period for content provided by each of one or more other content providers.

4. The method of claim 1, wherein identifying the load time period indicating how much time it will take for the first content to load at a client computing device comprises measuring one or more actual time periods taken by one or more client computing devices to load the first content.

5. The method of claim 1, wherein identifying the load time period indicating how much time it will take for the first content to load at a client computing device comprises receiving, from the first content provider, data specifying the load time period.

6. The method of claim 1, wherein identifying the load time period indicating how much time it will take for the first content to load at a client computing device comprises determining an average load time for loading the first content for each of a plurality of geographic areas.

7. The method of claim 1, wherein the first content provided by the first content provider includes a link to a resource that includes additional content of the first content provider.

8. The method of claim 1, further comprising transmitting a second instruction to the client computing device to not display the first content provided by the first content provider if the first content provided by the first content provider does not load within a load time threshold.

9. A system comprising:
a data processing apparatus; and
a computer storage medium encoded with a computer program, the program comprising data processing apparatus instructions that when executed by the data processing apparatus cause the data processing apparatus to perform operations comprising:
identifying, for first content provided by a first content provider, a load time period indicating how much time it will take for the first content to load at a client computing device;
determining that the load time period satisfies a load time criterion of a publisher;
determining that second content of a second content provider different from the first content provider will load on the client computing device in a second time period greater than the load time period; and
in response to determining (i) that the first load time period satisfies the load time criterion and (ii) that the second content of the second content provider will load on the client computing device in a second time period greater than the load time period:
selecting, from a set of content that includes at least the first content and the second content, the first content for presentation with the publication of the publisher instead of the second content of the second content provider; and
transmitting, to the client computing device, an instruction to present the selected content with the publication at the client computing device.

10. The system of claim 9, wherein the load time criterion specifies a load time threshold in which content of each content provider must load at the client computing device.

11. The system of claim 9, wherein determining that the load time period satisfies load time criterion of the publisher comprises determining that the load time period is shorter than a second load time period for content provided by each of one or more other content providers.

12. The system of claim 9, wherein identifying the load time period indicating how much time it will take for the first content to load at a client computing device comprises measuring one or more actual time periods taken by one or more client computing devices to load the first content.

13. The system of claim 9, wherein identifying the load time period indicating how much time it will take for the first content to load at a client computing device comprises receiving, from the first content provider, data specifying the load time period.

14. The system of claim 9, wherein identifying the load time period indicating how much time it will take for the first content to load at a client computing device comprises determining an average load time for loading the first content for each of a plurality of geographic areas.

15. The system of claim 9, wherein the first content provided by the first content provider includes a link to a resource that includes additional content of the first content provider.

16. The system of claim 9, wherein the operations comprise transmitting a second instruction to the client computing device to not display the first content provided by the first content provider if the first content provided by the first content provider does not load within a load time threshold.

17. A non-transitory computer storage medium encoded with a computer program, the program comprising instructions that when executed by one or more data processing apparatus cause the data processing apparatus to perform operations comprising:
identifying, for first content provided by a first content provider, a load time period indicating how much time it will take for the first content to load at a client computing device;
determining that the load time period satisfies a load time criterion of a publisher;

determining that second content of a second content provider different from the first content provider will load on the client computing device in a second time period greater than the load time period; and in response to determining (i) that the first load time period satisfies the load time criterion and (ii) that the second content of the second content provider will load on the client computing device in a second time period greater than the load time period:
  selecting, from a set of content that includes at least the first content and the second content, the first content for presentation with the publication of the publisher instead of the second content of the second content provider; and
  transmitting, to the client computing device, an instruction to present the selected content with the publication at the client computing device.

18. The non-transitory computer storage medium of claim 17, wherein the load time criterion specifies a load time threshold in which content of each content provider must load at the client computing device.

19. The non-transitory computer storage medium of claim 17, wherein identifying the load time period indicating how much time it will take for the first content to load at a client computing device comprises measuring one or more actual time periods taken by one or more client computing devices to load the first content.

20. The non-transitory computer storage medium of claim 17, wherein identifying the load time period indicating how much time it will take for the first content to load at a client computing device comprises determining an average load time for loading the first content for each of a plurality of geographic areas.

* * * * *